United States Patent
Beri et al.

(10) Patent No.: US 10,409,366 B2
(45) Date of Patent: Sep. 10, 2019

(54) METHOD AND APPARATUS FOR CONTROLLING DISPLAY OF DIGITAL CONTENT USING EYE MOVEMENT

(71) Applicant: Adobe Inc., San Jose, CA (US)

(72) Inventors: Tarun Beri, Distt. Ludhiana (IN); Vaibhav Tyagi, Noida (IN)

(73) Assignee: Adobe Inc., San Jose, CA (US)

( * ) Notice: Subject to any disclaimer, the term of this patent is extended or adjusted under 35 U.S.C. 154(b) by 555 days.

(21) Appl. No.: 14/263,496

(22) Filed: Apr. 28, 2014

(65) Prior Publication Data

US 2015/0309565 A1 Oct. 29, 2015

(51) Int. Cl.
| | |
|---|---|
| *G06F 3/048* | (2013.01) |
| *G06F 3/01* | (2006.01) |
| *G06F 3/0481* | (2013.01) |
| *G06F 3/0482* | (2013.01) |
| *G06F 3/0484* | (2013.01) |
| *G06T 3/00* | (2006.01) |

(52) U.S. Cl.
CPC .......... *G06F 3/013* (2013.01); *G06F 3/0481* (2013.01); *G06F 3/0482* (2013.01); *G06F 3/04812* (2013.01); *G06F 3/04842* (2013.01); *G06F 3/04845* (2013.01); *G06T 3/0025* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 3,718,386 A | 2/1973 | Lynn et al. | |
| 3,883,235 A | 5/1975 | Lynn et al. | |
| 5,689,619 A | 11/1997 | Smyth | |
| 5,731,805 A * | 3/1998 | Tognazzini | G06F 3/013 345/156 |
| 7,116,379 B2 | 10/2006 | Suzuki | |
| 7,335,948 B2 | 2/2008 | Lotfi et al. | |

(Continued)

OTHER PUBLICATIONS

Tobii Eye Tracking—White Paper, An Introduction to Eye Tracking Tobii Eye Trackers, Jan. 27, 2010, available at http://www.tobii.com/Global/Analysis/Training/VVhitePapers/Tobii_EyeTracking_Introduction_WhitePaper.pdf?epslanguage=en.

(Continued)

*Primary Examiner* — William C Trapanese
(74) *Attorney, Agent, or Firm* — Keller Jolley Preece (57) ABSTRACT

A computer implemented method and apparatus for controlling display of displayed digital content using eye movement. The method comprises mapping eye movements, tracked by a camera of a display device, to an area of interest of displayed content. A window containing a magnified version of display content from within the area of interest is generated. The magnified display content from the area of interest is displayed together with display content from outside the area of interest. A hovering pointer gesture is optionally displayed within the area of interest or a selectable function is performed if display content within the area of interest corresponds to a user interface function or a navigation option. According to some embodiments, the window containing magnified display content is only generated and displayed when the display content within the area of interest does not correspond to a user selectable function.

20 Claims, 4 Drawing Sheets

(56) References Cited

U.S. PATENT DOCUMENTS

| | | | |
|---|---|---|---|
| 7,572,008 B2 | 8/2009 | Elvesjo et al. | |
| 8,285,404 B1 | 10/2012 | Kekki | |
| 9,172,938 B2 | 10/2015 | Yoneda et al. | |
| 9,491,374 B1 | 11/2016 | Avrahami et al. | |
| 9,619,695 B2 | 4/2017 | Tschirhart et al. | |
| 9,652,047 B2 | 5/2017 | Mullins et al. | |
| 9,678,337 B2 | 6/2017 | Inoue et al. | |
| 9,878,723 B2 | 1/2018 | Kim | |
| 9,908,048 B2 | 3/2018 | Osman et al. | |
| 2004/0070620 A1 | 4/2004 | Fujisawa | |
| 2005/0073136 A1 | 4/2005 | Larsson et al. | |
| 2009/0315827 A1 | 12/2009 | Elvesjo et al. | |
| 2010/0033333 A1 | 2/2010 | Victor et al. | |
| 2011/0037896 A1 | 2/2011 | Lin et al. | |
| 2011/0081047 A1 | 4/2011 | Momosaki | |
| 2011/0296163 A1 | 12/2011 | Abernethy et al. | |
| 2012/0084682 A1 | 4/2012 | Sirpal et al. | |
| 2012/0256967 A1* | 10/2012 | Baldwin | G06F 3/013 345/684 |
| 2012/0300061 A1 | 11/2012 | Osman et al. | |
| 2013/0293550 A1 | 11/2013 | Cardno | |
| 2013/0314724 A1 | 11/2013 | Tamura et al. | |
| 2013/0335341 A1 | 12/2013 | Ishibashi | |
| 2014/0002352 A1* | 1/2014 | Jacob | G06F 3/013 345/156 |
| 2014/0013216 A1 | 1/2014 | Sakuta | |
| 2014/0049462 A1 | 2/2014 | Weinberger et al. | |
| 2014/0078181 A1 | 3/2014 | Harada | |
| 2014/0237366 A1* | 8/2014 | Poulos | G06F 3/011 715/728 |
| 2014/0347623 A1 | 11/2014 | Inoue et al. | |
| 2014/0361984 A1 | 12/2014 | Kim et al. | |
| 2014/0362202 A1 | 12/2014 | Tschirhart et al. | |
| 2014/0364212 A1 | 12/2014 | Osman et al. | |
| 2015/0232030 A1 | 8/2015 | Bongwald | |
| 2015/0234457 A1 | 8/2015 | Kempinski | |
| 2015/0301337 A1 | 10/2015 | Park et al. | |
| 2016/0098093 A1 | 4/2016 | Cheon et al. | |
| 2016/0150950 A1 | 6/2016 | Yu et al. | |
| 2016/0225012 A1 | 8/2016 | Ha et al. | |
| 2016/0246384 A1 | 8/2016 | Mullins et al. | |
| 2017/0163880 A1 | 6/2017 | Oshima et al. | |
| 2017/0190252 A1 | 7/2017 | Tschirhart et al. | |
| 2017/0212583 A1 | 7/2017 | Krasadakis | |
| 2017/0247041 A1 | 8/2017 | Kim | |
| 2017/0329325 A1 | 11/2017 | Hong et al. | |
| 2017/0357314 A1 | 12/2017 | Elvesjo et al. | |
| 2018/0115673 A1 | 4/2018 | Yamasaki et al. | |

OTHER PUBLICATIONS

U.S. Appl. No. 14/610,859, dated Jan. 26, 2017, Office Action.
U.S. Appl. No. 14/610,859, dated May 23, 2017, Office Action.
U.S. Appl. No. 14/610,859, dated Jun. 28, 2018, Office Action.
U.S. Appl. No. 14/610,859, dated Feb. 23, 2018, Office Action.
Kar-Han Tan; Eanbling Geniune Eye Contact and Acurate Gaze in Remote Collaboration,; IEEE Conferences; May 1, 2010; 3rd International Conference on Human Systems Interaction.
Shanjun Zhang;Gaze Assitant Eye Tracking and Image Wrapping; 2010 Fifth Conference on Frontier of Computer Science and Technology; Aug. 1, 2010.
U.S. Appl. No. 14/610,859, dated Nov. 15, 2018, Notice of Allowance.

* cited by examiner

METHOD AND APPARATUS FOR CONTROLLING DISPLAY OF DIGITAL CONTENT USING EYE MOVEMENT

BACKGROUND OF THE INVENTION

Field of the Invention

Embodiments of the present invention generally relate to and, more particularly, to a method and apparatus for controlling display of digital content using eye movement.

Description of the Related Art

Content display devices provide a small viewing area for content consumption. Content may be a digital document that includes text, images, and the like. In some instances, less than all of the text of a document may be displayed at a larger font for viewing, which may require additional zooming by the user to achieve a comfortable reading level. Displaying less than all of the text may cause a user to lose track of where the user is reading in the context of the document as a whole. Alternatively, a smaller font may be used in the display of more text of the document, which allows the user to see where they are reading in the context of the document as a whole, but again may require a user to adjust the zoom level to achieve a comfortable reading level. Both scenarios provide a poor user experience.

Therefore, there is a need for a method and apparatus for controlling magnification of digital content using eye movement.

SUMMARY OF THE INVENTION

A method for controlling display of digital content using eye movement is described. The method maps eye movements tracked by a camera of a content display device to an area of interest of displayed content, where the displayed content is displayed at a first zoom level. A window containing a magnified version of display content from within the area of interest is generated. The magnified display content from the area of interest is displayed together with display content from outside the area of interest. If display content within the area of interest corresponds to a user selectable function such as a user interface function selection or a navigation option selection, a hovering pointer gesture is displayed within the area of interest above the function or the selectable item is executed. According to some embodiments, the window containing magnified display content is only generated and displayed when the display content within the area of interest does not correspond to a user interface function or user navigation option.

The method displays a window over the displayed content comprising a portion of the displayed content, where the portion of the displayed content is located in the area of interest and displayed at a second zoom level, where the second zoom level is greater than the first zoom level. The window moves as the focus of the user, as indicated by the user's eye movements, changes.

In another embodiment, an apparatus for controlling magnification of digital content using eye movement is described. The apparatus comprises an eye tracking module for mapping eye movements to an area of interest of displayed content, where the displayed content is displayed at a first zoom level, and tracking the eye movements to determine a change in the area of interest. The apparatus also includes a content control module. According to some embodiments of the apparatus, the content control module includes a user input invocation module which is operative when display content within the area of interest corresponds to one of a user interface menu option and a user navigation option. The user input invocation module initiates display of a hovering pointer gesture within the area of interest. In addition, or alternatively, the user input invocation module executes a user selection such as a menu item or navigation selection. According to some embodiments of the apparatus, the content control module includes a magnifying module. The magnifying module initiates display of a window over the displayed content. The displayed window includes a portion of the displayed content, wherein the portion of the displayed content is located in the area of interest of the displayed content and displayed at a second zoom level, where the second zoom level is greater than the first zoom level. According to some embodiments, the magnifying module is only operative to initiate display of a magnification window when the display content within the area of interest is of a contextual nature (e.g., does not correspond to a user interface menu option or user navigation option).

In yet another embodiment, a computer readable medium for controlling magnification of a displayed digital content using eye movement is described. The computer readable medium stores instruction that when performed by a processor perform the method of controlling display of digital content using eye movement.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

While the method and apparatus is described herein by way of example for several embodiments and illustrative drawings, those skilled in the art will recognize that the method and apparatus for controlling magnification of digital content using eye movement is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for controlling magnification of digital content using eye movement defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for controlling magnification of content using eye movement. The embodiments map eye movements captured by a camera on a content display device to an area of interest on a display. A magnification window is created at a focal position on the display where the eye movement is centered. The magnification window is a new layer overlaid over content at the position where eye movement is centered. The magnification window includes a portion of the content located at the area of interest. The content in the magnification window is displayed at a zoom level greater than the zoom level of the content displayed on the content display device. As the area of interest changes as a user's eye moves left, right, up and down on the display, a position of the magnification window and portion of the content within the magnification window is adjusted to follow the user's eye movements. When a user's eye movement is tracked to the end of a page of the content, a next page of the content is displayed. In some embodiments, a fish-eye window is displayed. The fish-eye window includes a perspective view of the content. The perspective view provides an overall representation of the content with an indication of the area of interest.

Advantageously, the present invention may be used as a plug-in or a feature to a content display software application, such as ADOBE® Reader Mobile. The present invention provides a user with a more enjoyable content consumption experience by improving the readability of a document or other content.

As used herein, the term content display software may be any software capable of displaying digital content, for example, e-books, newspapers and documents. A pointer hover gesture includes a hover gesture performed by a mouse, finger, stylus, and the like.

Various embodiments of a method and apparatus for controlling magnification of digital content using eye movement are described. In the following detailed description, numerous specific details are set forth to provide a thorough understanding of claimed subject matter. However, it will be understood by those skilled in the art that claimed subject matter may be practiced without these specific details. For example, although in the illustrated embodiments the display device is mobile, a non-mobile display device is also contemplated. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
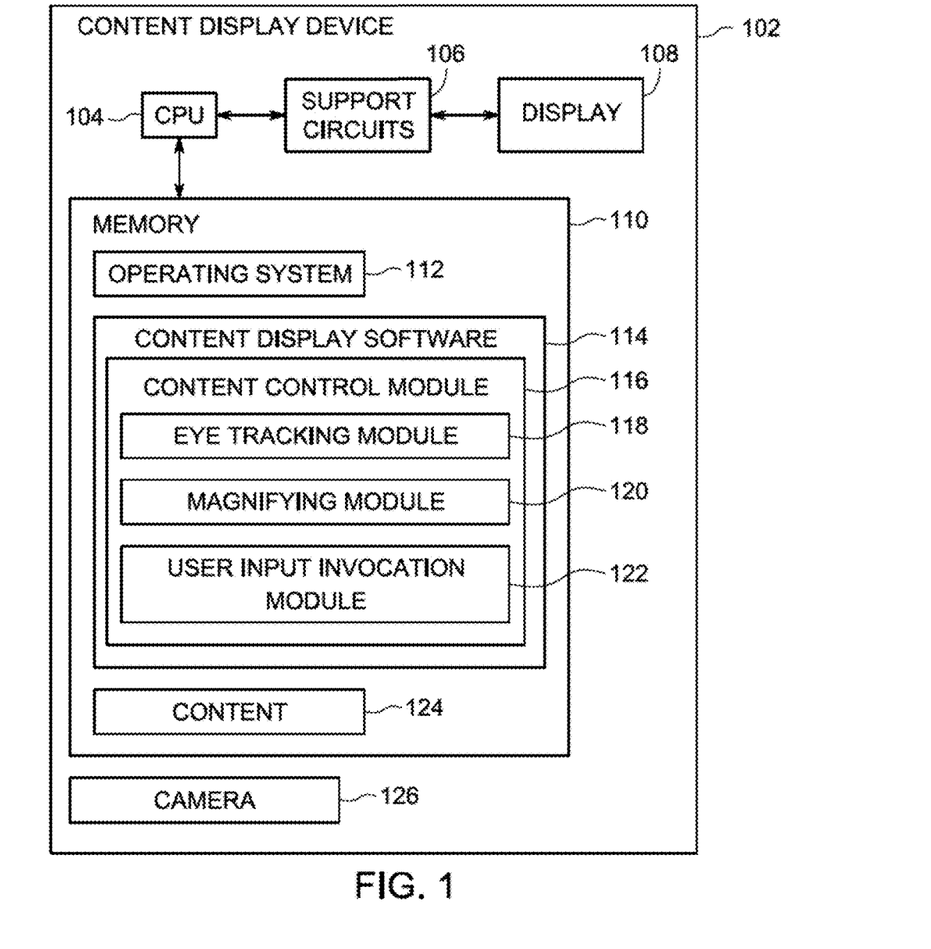
FIG. 1 is a block diagram of an apparatus for controlling magnification of digital content using eye movement, according to one or more embodiments.

FIG. 1 is a block diagram of an apparatus 100 for controlling magnification of digital content using eye movement, according to one or more embodiments. The apparatus 100 includes a content display device 102. The content display device 102 is a computing device, for example a desktop computer, laptop, a mobile phone, tablet computer, and the like. The content display device 102 includes a Central Processing Unit (CPU) 104, support circuits 106, a display 108, a memory 110, and an image capture device such as camera 126. In an alternate hardware embodiment, the content display device 102 may include more than one camera 126. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 110 includes at least one of Read Only Memory (ROM), Random Access Memory (RAM), disk drive storage, optical storage, removable storage and/or the like.

The memory 110 includes an operation system 112, content display software 114, and content 124. Content 124 may include any digital content that may be viewed using the content display software 114, such as a digital document that includes text, images, and the like. The operating system 112 may include various commercially known operating systems. The content display software 114 includes any software capable of displaying digital content, such as ADOBE® Reader, ADOBE® Reader Mobile, and the like. The content display software 114 defines a user interface which enables the user to invoke, by entry of input, a menu item selection or a navigation option. The content display software 114 includes a content control module 116. The content control module 116 includes eye tracking module 118, magnifying module 120, and user input invocation module 122.

When content 124 is accessed with content display software 114, the eye tracking module 118 accesses eye position information read by the camera 126. The eye position information includes a position on the display 108 (for example x, y coordinates) where a user's left eye is focused, and a position on the display 108 (for example x, y coordinates) where the user's right eye is focused. The eye tracking module 118 determines a focal point on the display by determining an average of the x, y coordinates of the user's left and right eye focus positions. The magnifying module 120 maps the eye position information to an area of interest on the display 108. The area of interest extends to a width from the x, y coordinate of the left eye to the x, y coordinate of the right eye. If the width is below a predefined threshold, the magnifying module expands the area of interest to a minimum width (in pixels). In some embodiments, the magnifying module 120 defines a height of the area of interest to be equal to the width of the area of interest. In some embodiments, the magnifying module 120 sets the height of the area of interest to a pre-defined height that may be configured by a user. The magnifying module 120 creates a magnification window to display portion of the content at the area of interest and positions the magnification window centered above the focal point on the display 108.

The magnifying module 120 accesses a portion of the content 124 that is located within the area of interest on the display 108. The magnifying module 120 displays the portion of the content at an increased zoom level in the magnification window, for example, at a zoom level 20% greater than the zoom level of the content 124. The zoom level of the text in the magnification window may be adjusted by a user. In some embodiments, the magnification window includes buttons, for example a "+" button and a "−" button that may be used to adjust the zoom level within the magnification window. The eye tracking module 118 continually monitors the eye position information read by the camera 126 and adjusts the position and content in the magnification window as the eye position information changes. When the eye position information read by the camera 126 identifies that the eye position information has reached a boundary of readable content (e.g., a bottom of a page), the content control module 116 displays a next page of the content 124.

The magnifying module 120 displays a perspective view of the content 124 on the display 108. The magnifying module 120 creates a window that includes a displayed portion of the content 124, but at a decreased zoom level such that the entire displayed portion of the content 124 on the display 108 is visible in the perspective view window. The magnifying module 120 then identifies within the perspective view window a current viewing position of the magnification window.

When the eye tracking module 118 determines that the eye position information on the display 108 has not changed for a pre-defined period of time, for example, 2 seconds, the user input invocation module 122 processes a pointer hover gesture at the focal position on the display 108. The hover module 122 passes the pointer hover gesture information to the content display software 114. The content display software 114 processes the pointer hover gesture information per normal operations as though an actual pointer hover occurred. The content display software 114 identifies the object below the focal position and takes an appropriate action. For example, if an object on the display 108 located below the focal position is a toolbar, the content display software 114 may display a tool tip. If the object on the display 108 located below the focal position is a menu item, the content display software 114 may open the menu item. If the object on the display 108 located below the focal position is a sticky note (or other navigatable content element destination e.g., text, image), the content display software 114 may open the content element. In some embodiments, the opened item is displayed for a pre-determined amount of time. In some embodiments, the opened item is displayed until the user's focal position changes based on the eye position information read by the camera 126.

Figure 2:
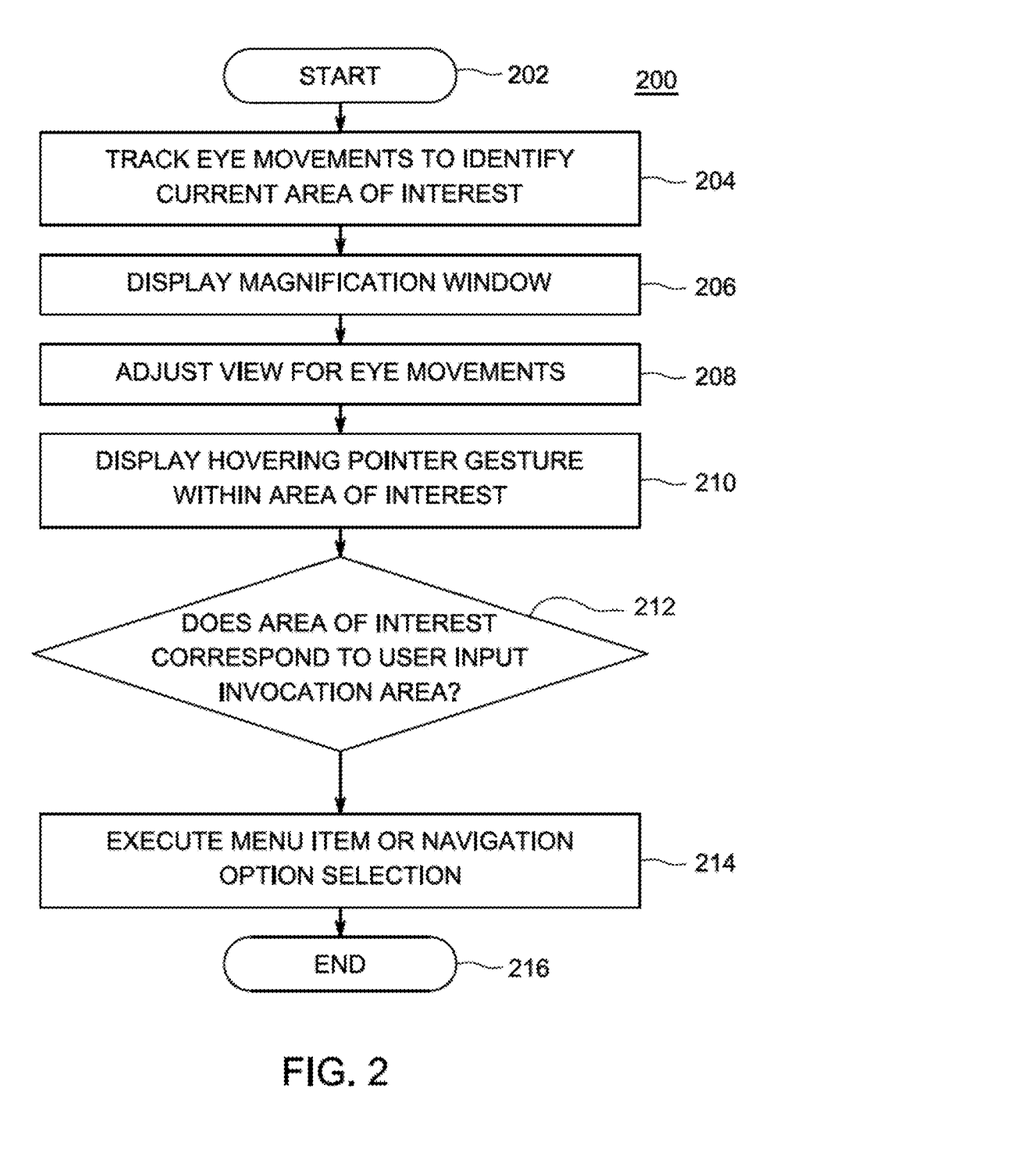
FIG. 2 depicts a flow diagram of a method for controlling magnification of digital content using eye movement as performed by the content control module of FIG. 1, according to one or more embodiments.

FIG. 2 depicts a flow diagram of a method 200 for controlling magnification of digital content using eye movement as performed by the content control module 116 of FIG. 1, according to one or more embodiments. The method 200 creates a magnification window over an area of interest of the content. The magnification window displays a portion of the content at a zoom level higher than the zoom level of the content. The method 200 follows a user's eye movements and adjusts the magnification window and its contents according to the user's eye movements. The method 200 starts at step 202 and proceeds to step 204.

At step 204, the method 200 maps eye movements of a user to an area of interest of content on a display of the content display device. The content is displayed at a first zoom level. The first zoom level is typically a default level of magnification for the content display device, for example, 100%. The content display device includes a camera. Camera driver provides information regarding eye movements of a user looking at the content display device. The method 200 locates eyes within a face, the orientation of each eye with respect to the screen and orientation of each eye with respect to the face. The method 200 uses face detection software compatible with the content display device. The face detection software locates eyes within the face, orientation of the face with respect to the display of the content display device, and orientation of the eyes with respect to the face. For example, ANDROID has a Camera.Face feature that provides information about a face that is identified through face detection processing of the image provided by the camera. A Camera.FaceDetection. Listener feature returns a list of face objects for use in focusing. Specifically, the Camera.FaceDetection. Listener returns leftEye and rightEye objects. The leftEye and rightEye objects return coordinates of the center of the left and right eyes, respectively. The coordinates identify a point on the content display device display, by for example x, y coordinates, where each eye is focused.

The method 200 proceeds to step 206, where the method 200 displays a window over the area of interest. The window includes a portion of the content that is located in the area of interest. The portion of the content displayed in the window is a magnified view of the area of interest, as described in further detail with respect to FIG. 3, below. As a result, a magnification window is created in the content display application that includes the content within the area of interest at a second zoom level, where the second zoom level is greater than the first zoom level of the content.

The method 200 proceeds to step 208, where the method 200 adjusts the position and content of the magnified view based on eye movements of the user. The method 200 continuously processes the eye movement information received from the camera driver. As the eye movement changes, for example, as a user moves his eyes left, right, up, or down, the method 200 identifies the area of interest in the magnification window and adjusts the position and content of the magnification window. The magnification window follows the eye movements to provide a user with a magnified view of the area of interest where the user is viewing the content.

In order to follow eye movements in real-time, in some embodiments, pre-calculations are performed. For example, the method 200 tracks a reading speed of the user. The method 200 also identifies an order in which the user is reading (e.g., left to right, top to bottom). Once the reading speed and order of reading is known, the method 200 predicts a next area of interest. For the next area of interest, the method 200 maps the content in the next area of interest while the content in a current area of interest is displayed. Alternately, the method 200 maps the content in the next area of interest during another available time. As such, as soon as the user's eyes move to the predicted area of interest, the magnification window is displayed with the mapped content.

When the method 200 identifies that the eye movement has reached a boundary of readable content (e.g., an end of page), the method 200 displays a next page of the content, and adjusts the position of the magnification window to a location, for example, a top left corner of the display. The method 200 displays the content of the next page magnified in the magnification window.

According to some embodiments, a hovering pointer is generated and appears within the magnification window. If the method 200 determines that no eye movement has occurred for a pre-defined period of time, for example, 2 seconds, the method 200 sends a pointer hover gesture event to the content display software application at step 210. In its simplest form, a hover gesture event may be nothing more than a relocation of a previously established cursor position on the display now outside the magnification window to an updated position at the focal position within the magnification window. In this regard, the content display software application responds as if the pointer hover gesture event was performed with a conventional mouse pointer "click" or a touch event on the display of the content display device. Continued focus at the same location optionally triggers still another event.

At step 212, the method 200 determines whether the area of interest corresponds to a user input invocation area. That is, the content display software determines whether an object below the focal position is a user selectable object. User selectable objects include navigation options such as links, hyperlinks and universal resource locators, and also user interface options such as icons command buttons, menu items, task bar items, and scroll bar items). The content display software processes the pointer hover gesture event with respect to a selectable object per normal pointer or touch operations. That is, a focal position is "mapped" to the graphical user interface of the content display software in the same manner as the cursor or pointer position moved by a mouse or touch screen is mapped.

A focal position mapped to a user selectable object location for a predetermined or selectable amount of time triggers the object selection. A focal position mapped to a display location which does not correspond to a user selectable object is treated as contextual information to which only the magnification window and/or display of a gesture pointer applies.

For example, if an object on the display located below a current focal position is within a toolbar window (i.e., an n-dimensional array containing a plurality of selectable objects), the content display software may display a hover gesture pointer. If the object below the focal position is a selectable object corresponding to a specific tool, then tool tip indicia corresponding to the specific tool is selected and displayed. Likewise, if the object on the display located below the focal position is a menu item, the content display software may proceed to open the menu item to provide a list of selectable menu objects. If the object on the display located below the focal position is a sticky note (or other content element e.g., text, image), the content display software may open the content element. In some embodiments, the opened item is displayed for a pre-determined amount of time. In some embodiments, the opened item is displayed until the user's focal position changes based on the eye position information read by the camera. According to some embodiments, display of the magnification window according to step 206 is performed only when the display content within the area of interest does not correspond to a user interface menu option or a user navigation option.

The method 200 proceeds to step 216 and ends.

Figure 3:
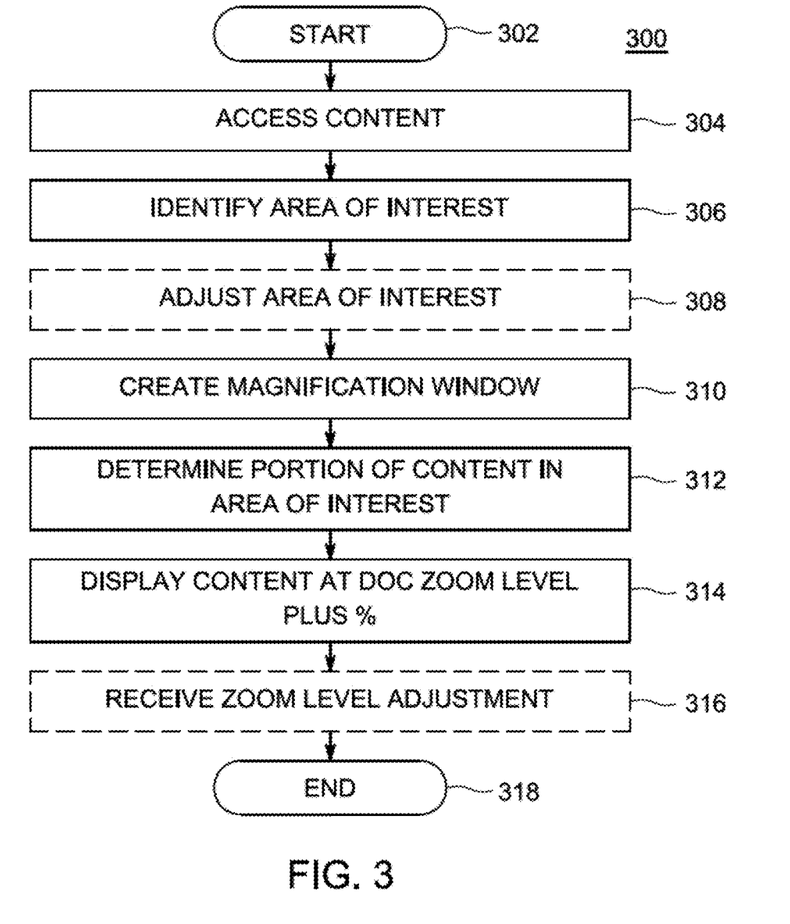
FIG. 3 depicts a flow diagram of a method of creating a magnified view as performed by the magnifying module of FIG. 1, according to one or more embodiments.

FIG. 3 depicts a flow diagram of a method 300 for creating a magnified view as performed by the magnifying module 120 of FIG. 1, according to one or more embodiments. The method 300 determines an area of interest in content in which to magnify and then displays the magnified content in a window. The method 300 starts at step 302 and proceeds to step 304.

At step 304, the method 300 accesses digital content from within a content display software application. The content includes content elements, such as text, images, and the like. In some embodiments, the content display software application is manually operated so as to open a magnifying mode. In some embodiments, the content display software application automatically opens in a magnifying mode. The content may be displayed at a default zoom level. The method 300 records the zoom level at which the content is displayed.

The method 300 proceeds to step 306, where the method 300 identifies an area of interest. The method 300 determines the area of interest based on the focal points of the left and right eyes. The area of interest spans a width from the x, y coordinate of the focal point of the left eye to the x, y coordinate of the focal point of the right eye. In some embodiments, the method 300 determines a height of the area of interest equal to the width. In some embodiments, the method 300 uses a pre-defined height configurable by a user, for the height of the area of interest.

The method 300 optionally proceeds to step 308, where the method 300 adjusts a size of the area of interest. If, for example, the focal points of the left and right eye are close together or focused on a same point, the area of interest may be small. The method 300 determines whether the width of the area of interest is below a pre-defined threshold. If it is, the method 300 increases the area of interest to make it at least as wide as the pre-defined threshold.

The method 300 proceeds to step 310, where the method 300 creates a magnification window in the content display software application. The magnification window is a layer created over the content. The method 300 creates the magnification window centered at an average of the x, y coordinates of the focal points of the left and right eye focus positions. The method 300 sets a size of the magnification window in proportion to the display; however, a user may readjust the size of the magnification window by dragging corners of the magnification window. The magnification window is created with buttons, for example a "+" button and a "−" button that may be used by the user to adjust the zoom level in the magnification window.

The method 300 proceeds to step 312, where the method 300 determines a portion of the content that resides in the area of interest. The method 300 uses the x, y coordinates of the area of interest and maps the coordinates to the content.

The method 300 proceeds to step 314, where the method 300 displays the mapped content in the magnification window. In some embodiments, the method 300 displays the portion of the content within the area of interest at a zoom level that is increased by a pre-determined percentage, for example 20% greater than the zoom level of the displayed digital content outside of the magnification window. The digital content is displayed at first zoom level, for example, 100% zoom. The magnified content is displayed in the magnification window at a second zoom level, for example, 120% zoom. In some embodiments, the zoom level is determined such that the font in the magnification window is a font size that is suitable for reading. For example, if the content is a 4 pt font, the zoom level is increased times three to bring the font to 12 pt. If the content is font size 8, the zoom level is increased 1.5 times.

The method 300 displays the magnification window over the content, with a portion of the content identified at the area of interest, magnified in the magnification window. The content in the magnification window is not compromised. The content in the magnification window does not appear blurry or pixelated as it would if the content were enlarged as a raster image. Rather, the content is directly rendered in the magnification window at the greater zoom level. In addition, the content boundary of the content outside of the magnification window is unaffected. The content remains unchanged with the creation of the magnification window.

In some embodiments, the method 300 also displays a fish-eye window that includes a perspective view of the content. The fish-eye window is a second layer created over the content, the first layer being the magnification window. The fish-eye window displays the content in its entirety but at a third zoom level, where the third zoom level is less than the first zoom level. The third zoom level is low enough such that all of the content in the display is visible in the fish-eye window. The perspective view provides an overall representation of the content with an indication of the area of interest. The method 300 sets a size of the fish-eye window in proportion to the display; however, a user may readjust the size of the fish-eye window by dragging corners of the fish-eye window. In some embodiments both the first layer and the second layer (i.e., the magnification window and the fish-eye window) are displayed simultaneously over the digital content.

The method 300 optionally proceeds to step 316, where the method 300 receives input to adjust the zoom level in the magnification window. Such input is provided in response to a selection of, for example, the "+" button and the "−" button. The method 300 adjusts the zoom level of the content in the magnification window per the received input.

The method 300 proceeds to step 318 where the method 300 ends.

Figure 4A:
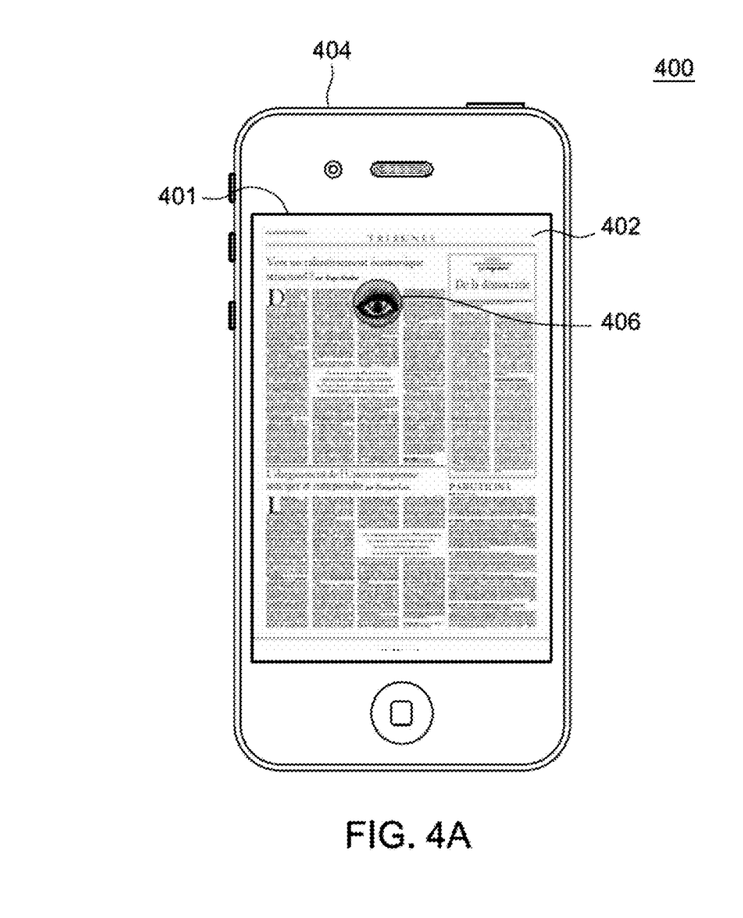
FIGS. 4A and 4B illustrate a display on a content display device using the method 200, according to one or more embodiments.
Figure 4B:
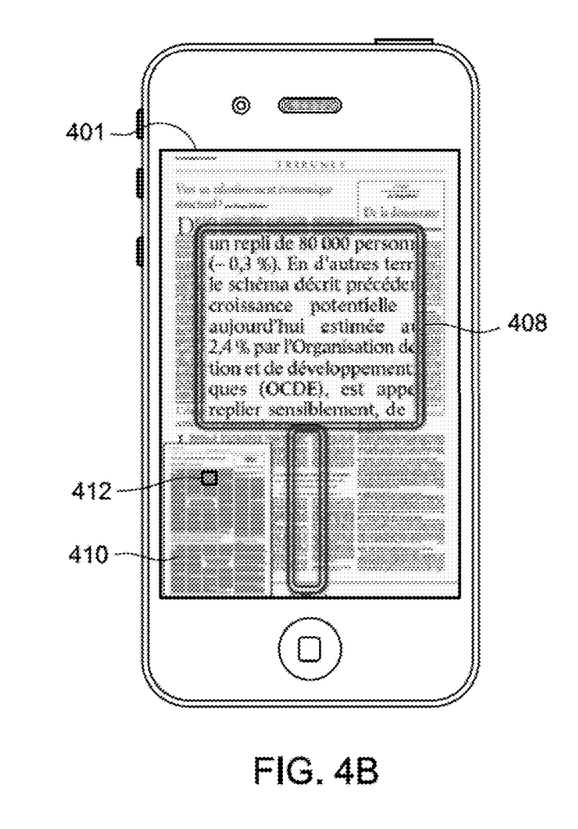

FIGS. 4A and 4B illustrate a display 401 on a content display device 400 using the method 200, according to one or more embodiments. FIG. 4A shows content 402 opened in a content display software application, such as ADOBE® Reader Mobile. A camera 404 of the content display device 400 reads where, on the content display device 400, a user's left and right eyes are focused. A focal point 406 depicts where a user is looking in the content 402.

FIG. 4B illustrates a magnification window 408 on the display 401. The magnification window 408 includes a portion of the content at a zoom level greater than that of the displayed content not in magnification window 408. A perspective view 410 on the display 401 that provides an indication 412 of the area of interest, and hence the portion of the content, displayed in the magnification window 408.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality

The invention claimed is:

1. A computer implemented method comprising:
providing, for display to a user by way of a display screen on a user client device, a graphical user interface comprising display content;
tracking, by way of a camera of the user client device, user eye movements with respect to the display content on the display screen;
identifying an area of interest associated with a location of eye focus on the display screen;
determining that the area of interest of the display content does not correspond to a graphical user interface object associated with a function;
generating, automatically without further user input in response to the area of interest of the display content not corresponding to the graphical user interface object, a window containing a first subset of the display content from the area of interest;
displaying the window together with a portion of the display content from outside the area of interest, wherein the first subset of the display content within the window is displayed at a higher zoom level than the portion of the display content from outside the area of interest;
determining a change of eye focus of the user within the window; and
based on the change of eye focus, modifying the display content within the window from the first subset of the display content from the area of interest to a second subset of the display content from the area of interest.

2. The method of claim 1, wherein identifying the area of interest comprises determining a first position on the display screen of the user client device where a left eye of a user is focused and a second position on the display screen where a right eye of the user is focused.

3. The method of claim 1, further comprising displaying a next page of the display content when the tracked eye movements reach a bottom of a current page.

4. The method of claim 1, wherein the higher zoom level of the display content within the window is adjustable.

5. The method of claim 1, further comprising removing the window when the eye movements in the window are not trackable.

6. The method of claim 2, further comprising:
determining that a distance between a left eye focal point and a right eye focal point falls below a width threshold; and
generate a smaller area of interest, wherein the smaller area of interest is larger than a predetermined threshold.

7. The method of claim 1, further comprising:
determining, based on the user eye movements, that a focal position remains on a selectable object of the display content for a threshold period of time; and
in response to determining that the focal position remains on the selectable object for the threshold period of time, automatically selecting the selectable object thereby causing performance of an operation associated with the selectable object.

8. A system for controlling display of digital content using eye movement comprising:
a display;
a camera;
at least one processor; and
a non-transitory storage medium comprising instructions thereon that, when executed by the at least one processor, cause the system to:
provide, for display to a user by way of the display, a graphical user interface comprising display content;
track, by way of the camera, eye movements with respect to the display content on the display;
map an eye movement to a portion of display content defining an area of interest displayed at a first zoom level;
determine that the area of interest of the display content does not correspond to a graphical user interface object associated with a function;
display, automatically without further user input in response to the area of interest of the display content not corresponding to the graphical user interface object, a magnification window over the display content, the magnification window comprising a first portion of the display content, wherein the first portion of the display content is located in the area of interest and displayed at a second zoom level, where the second zoom level is greater than the first zoom level;
determine a change of eye focus of the user within the magnification window; and
based on the change of eye focus modifying the display content within the magnification window from the first portion of the display content from the area of interest to a second portion of the display content from the area of interest.

9. The system of claim 8, further comprising instructions that, when executed by the at least one processor, cause the system to:
determine that a distance between a left eye focal point and a right eye focal point falls below a width threshold; and
generate a smaller area of interest, wherein the smaller area of interest is larger than a predetermined threshold.

10. The system of claim 8, further comprising instructions thereon that, when executed by the at least one processor, cause the system to:
adjust a location of the magnification window in response to detecting that the eye movements indicate a change in the area of interest.

11. The system of claim 8, further comprising instructions thereon that, when executed by the at least one processor, cause the system to adjust the second zoom level of the display content.

12. The system of claim 8, further comprising instructions thereon that, when executed by the at least one processor, cause the system to remove the magnification window when the eye movements in the magnification window are not trackable.

13. The system of claim 8, further comprising instructions that, when executed by the at least one processor, cause the system to:
determine, based on the eye movement, that a focal position remains on a selectable object of the display content for a threshold period of time by tracking the eye movement by way of the camera to identify a first position on the display where a left eye is focused and a second position on the display where a right eye is focused; and in response to determining that the focal position remains on the selectable object for the threshold period of time, automatically select the selectable object thereby causing performance of an operation associated with the selectable object.

14. A non-transitory computer readable medium for storing computer instructions that, when executed by at least one processor, cause a computing device to:

provide, for display to a user by way of a display screen on a user client device, a graphical user interface comprising display content;

track, by way of a camera of the user client device, eye movements with respect to the display content on the display screen;

based on a tracked eye movement:
identify an area of interest in the display content on the display screen associated with a location of eye focus;

determine that the area of interest of the display content does not correspond to a graphical user interface object associated with a function;

generate, automatically without further user input in response to the area of interest of the display content not corresponding to the graphical user interface object, a window containing a magnified version of a first subset of the display content from within the area of interest;

display the magnified first subset of the display content within the window together with a portion of the display content from outside the area of interest, wherein the first subset of the display content within the window is displayed at a higher zoom level than the portion of the display content from outside the area of interest;

determine a change of eye focus of the user within the window; and based on the change of eye focus, modify the display content within the window from the first subset of the display content from the area of interest to a second subset of the display content from the area of interest.

15. The non-transitory computer readable medium of claim 14, further comprising instructions, that when executed by at least one processor, cause the computing device to:

determine that a distance between a left eye focal point and a right eye focal point falls below a width threshold; and generate a smaller area of interest, wherein the smaller area of interest is larger than a predetermined threshold.

16. The non-transitory computer readable medium of claim 14, further comprising instructions, that when executed by at least one processor, cause the computing device to:

display a next page of the displayed content when the tracked eye movements reach a bottom of a current page; and remove the window when the eye movements in the window are not trackable.

17. The non-transitory computer readable medium of claim 14, further comprising instructions, that when executed by at least one processor, cause the computing device to maintain content boundaries of the displayed content outside the window.

18. The non-transitory computer readable medium of claim 17, wherein the displayed content outside the window is not altered and remains displayed outside the window.

19. The non-transitory computer readable medium of claim 14, further comprising instructions, that when executed by at least one processor, cause the computing device to:

determine, based on the eye movement, that a focal position remains on a selectable object of the display content for a threshold period of time by tracking eye movements by way of the camera to identify a first position on the display screen where a left eye of is focused and a second position on the display screen where a right eye is focused; and in response to determining that the focal position remains on the selectable object for the threshold period of time, automatically select the selectable object thereby causing performance of an operation associated with the selectable object.

20. The non-transitory computer readable medium of claim 14, further comprising instructions, that when executed by at least one processor, cause the computing device to display a perspective view window as the window.

* * * * *